INVENTOR
Kenneth John William Sheffield
By McDougall, Hersh & Scott
Attys

March 7, 1967  K. J. W. SHEFFIELD  3,307,589
ATTACHMENT OF BRAID-COVERED CONVOLUTED
TUBING TO SOLID END SLEEVES
Filed April 20, 1964  2 Sheets-Sheet 2

INVENTOR
Kenneth John William Sheffield
By McDougall, Hersh & Scott
Attys

United States Patent Office 3,307,589
Patented Mar. 7, 1967

3,307,589
ATTACHMENT OF BRAID-COVERED CONVOLUTED TUBING TO SOLID END SLEEVES
Kenneth John William Sheffield, Witney, England, assignor to DK Manufacturing Company, Batavia, Ill., a corporation of Illinois
Filed Apr. 20, 1964, Ser. No. 360,873
Claims priority, application Great Britain, May 2, 1963, 17,436/63
10 Claims. (Cl. 138—109)

When attaching convoluted flexible tubing, of the type protected by an external sheath of braid, to a rigid end piece, generally a tubular sleeve welded to the end of the convoluted tubing, either in butted or overlapping fashion, it is also generally required to anchor the braid to the same end piece so as to prevent pressure of the fluid in the tubing from exerting longitudinal stress on the convoluted tubing itself by causing such longitudinal stress to be taken up by the braid. For this purpose it has been the normal practice to place an external sleeve over the end of the convoluted or corrugated tubing so as to embrace the tubing and the braid, and then to effect a second weld after the corrugated tubing has been welded to the tubular end piece, this second weld securing the braid and sleeve to the tubular end piece. This form of connection has not proved very satisfactory because the heat stored in the large body of weld required caused weakening of the braid and of the last convolutions of the tubing for an appreciable distance with consequential risk of fracture in use.

In an alternative construction, the braid and external sleeve are extended beyond the end of the corrugated tubing, and a braid-attachment ring, which is a sliding fit on the tubing and inside the sleeve, is introduced into the projecting part of the braid and sleeve, this ring being then welded to the tubular end piece by a second weld provided at its outer face and the end of the braid and sleeve are welded to the outer surface of this braid attachment ring. While the body of welding material required with this form at any individual weld is very much smaller so that overheating effects are much more localized, it has nevertheless been found that the braid is weakened near its attachment end and is therefore liable to fracture adjacent the attachment weld under a stress which is considerably smaller than that which would cause fracture of the unaffected part of the braid.

The present invention has for an object to provide an improved attachment of convoluted tubing protected by an external braid to a tubular end piece in which the risk of braid fracture is further reduced.

According to the present invention a braid-attachment ring or collar is employed which is tapered from a maximum diameter adjacent to the convoluted tubing which is substantially equal to the outside diameter of the convoluted tubing, and the hitherto usual cylindrical sleeve is replaced by a conical ferrule substantially matching the taper of the attachment ring or collar, and this ferrule is slid into frictional contact with the braid on the tapered outer surface of the collar, the end of the braid being secured by welding to the ferrule near the outer end thereof. Preferably a metal ring of the same material as the ferrule and braid and slidable on the tubular end piece is slid towards the ferrule so as to clamp a turned-over portion of the braid between this ring and the end of the ferrule, the gap being then closed by a weld which incorporates the end of the braid. Any longitudinal stress on the braid will pull the ferrule into tighter contact with the tapered surface of the collar, thus increasing the clamping effect on the braid, so that substantially all the stress on the braid is taken up by the clamped connection between the ferrule and collar, only a minor portion of the stress reaching the welding connection between the braid and ferrule.

In the case of annular ducting having parallel circular convolutions, one single weld may be employed for the attachment for securing the taper collar in position and attaching a butted end sleeve to the convoluted tubing or ducting. This can be effected by leaving a short end piece of the ducting free from convolutions and sliding a collar of slightly less length on to this non-convoluted end piece, whereafter the free edge of the end piece is spun outwardly to form a short flange retaining the collar. A tubular end piece is then placed in butting alignment against this flange and a weld effected from the outer side, employing the flange as a part of the welding material.

Further objects and advantages of the present invention will appear from the following description, taken with the accompanying drawings, in which.

Figure 1:
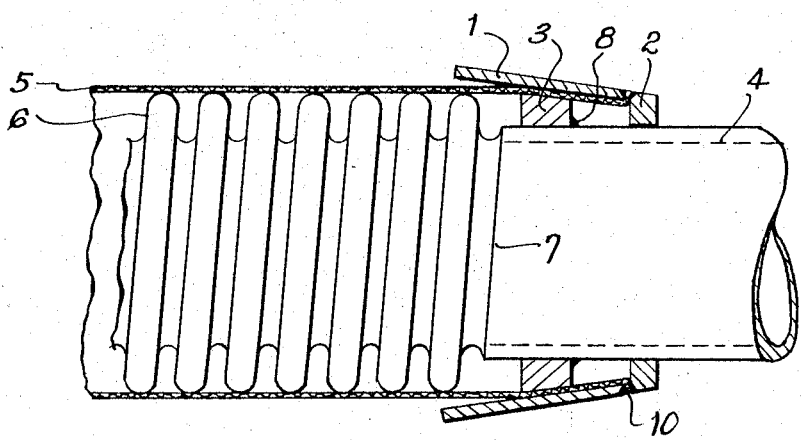
FIG. 1 is a longitudinal section showing the end construction of a braid-covered flexible convoluted tube to be described as an illustrative embodiment of the present invention.
Figure 1B:
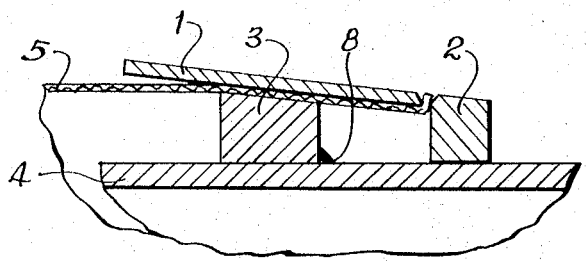
FIG. 1b is a fragmentary section similar to FIG. 1 but representing an intermediate stage in the attachment of the braid to the end section, before the completion of the final weld.
Figure 1A:
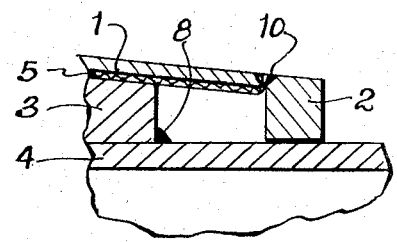
FIG. 1a is a fragmentary enlarged section corresponding to a portion of FIG. 1.

FIGS. 1, 1a and 1b show the invention as applied to helically convoluted tubing 6 covered with an external wire braid 5 and provided with a tubular end piece 4 which preferably, and as illustrated, is joined to the end of the tubing by butt-welding along a helical line 7 near the bottom of the convolution. A collar 3 having a bore fitting closely on the tubular end piece 4 and tapered at its outer side from a maximum diameter equal to the outside diameter of the tubing 6 at the end adjacent the convoluted tubing, is placed on the tubular end piece 4 and secured to it by a weld 8. After the projecting part of the braid 5 has been pulled over the collar 3, a ferrule 1 having a taper corresponding to the taper of the collar 3, is drawn over the collar and braid to clamp the braid in position. The free end of the braid is then turned outwardly over the outer, smaller-diameter end of the ferrule 1. A weld ring 2, the bore of which fits on to the cylindrical outer surface of the tubular end piece 4 while its outer surface is tapered to form a continuation of the taper of ferrule 1, is moved into close abutment with the ferrule 1 and the turned-over portion of the braid 5, as shown in FIG. 1a. Finally the ring 2 is joined to the ferrule 1 by welding from the outer side, the weld being shown at 10 (FIGS. 1 and 1b) and arranged to incorporate the material of the turned-over portion of the braid 5.

It will be readily appreciated that any longitudinal stress exerted on the braid 5 which might tend to move the braid over the tapered surface of the locking ring 3, would, due to the provision of the weld 10, move the ferrule 1 into tighter gripping contact with the braid, with the result that the braid is firmly anchored to the extension tube 4 by clamping of a portion which is sufficiently far removed from the weld 10 to be substantially unaffected by the welding heat; while only a very minor amount of stress will reach the welded joint 10.

Figure 2A:
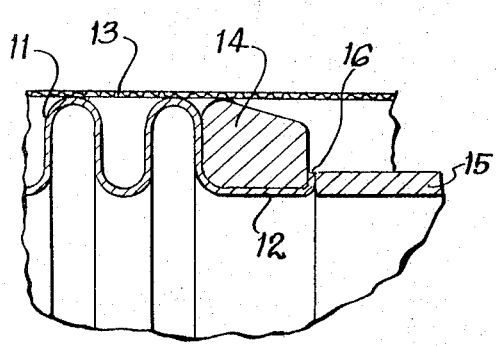
FIG. 2a is a fragmentary section similar to FIG. 2 but showing the modified embodiment in a still earlier stage of manufacture.
Figure 2:
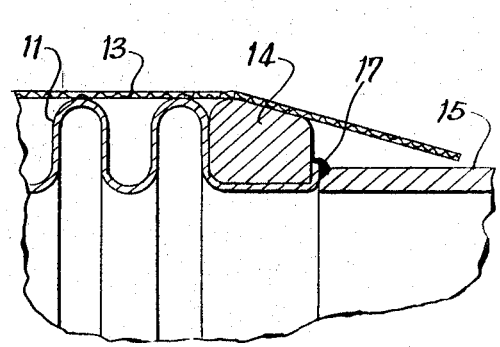
FIG. 2 is a fragmentary section showing a modified embodiment in an intermediate stage of manufacture.
Figure 3:
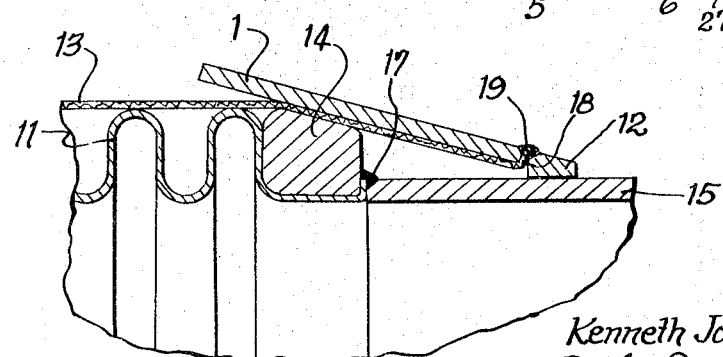
FIG. 3 is a fragmentary section showing the modified embodiment in its completed form.

FIGS. 2, 2a and 3 are fragmentary sections illustrating one form of the invention as applied to annular ducting having parallel convolutions. FIGS. 2 and 2a show the junction in intermediate stages of its manufacture, while FIG. 3 shows the completed junction. The convoluted ducting indicated at 11 is first provided at its end with a non-convoluted cylindrical end portion 12. Similarly to the case of FIG. 1, the ducting is protected by an external braid, which is shown at 13. To anchor the braid, a locking collar 14, similar to the collar 3 of FIG. 1, is fitted on to the cylindrical portion 12 in abutment with the last convolution of the convoluted tubing 11. The free end of the cylindrical portion 12 is then spun over to form a flange 16 that will retain the collar 14 in such close abutting relation, and a length 15 of extension tubing is placed in aligned abutment with the cylindrical end piece 12 at flange 16. A weld 17 is then effected joining the abutting ends and incorporating the material of the flange 16, which thus forms part of the weld joining the cylindrical portion 12, the end piece 15, and the collar 14. The further operation and construction of the connection are similar to those described with reference to FIG. 1, the additional parts employed having been given the same reference numerals as in that figure. A ferrule 1 is placed over the collar 14 and braid 13, the end of the braid being turned outwardly as shown at 18, whereafter a weld ring 2 is placed against the turned-out portion 18 and fused to the ferrule by a weld 19 incorporating the end portion 18.

Figure 4:
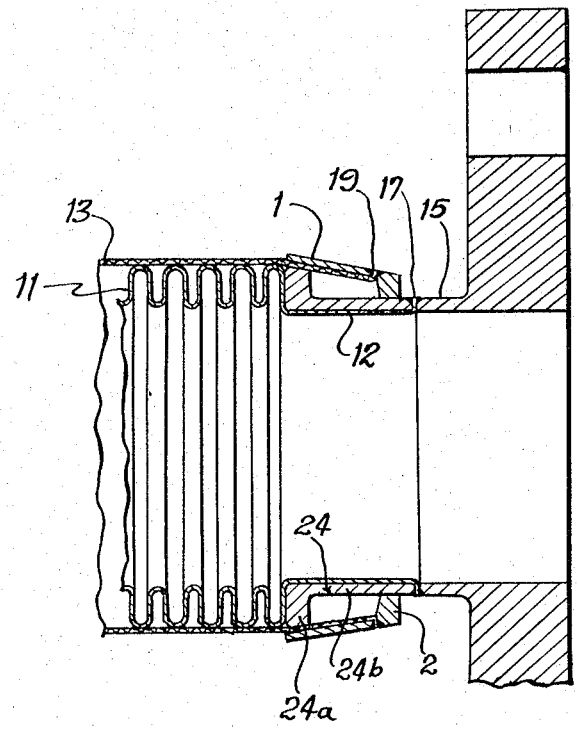
FIG. 4 is a longitudinal section showing another modified embodiment of the present invention.

FIG. 4 is a sectional elevation similar to FIG. 3, illustrating a further development. The cone-shaped collar 14 of FIG. 3 has been replaced by a bush 24 which, in addition to a trunconical portion 24a, includes a sleeve portion 24b of similar diameter and wall thickness to the tubular end-piece portion 15 and of such a length as to form a guide for weld ring 2 and to project beyond the latter, so that the weld 17 between the bush 24 and the end-piece 15 can be effected after completing the assembly of the bush 24 with the braid 13, the ferrule 1, and the weld ring 2. As before, the flange 16 is incorporated into the weld 17.

Various other modifications, alternative constructions and equivalents may be employed without departing from the true spirit and scope of the invention, as exemplified in the foregoing description and defined in the following claims.

Thus, for example, the tube end piece 4 of FIGURE 1 can be modified to have a centering extension which enters the adjacent portion of the flexible tube or duct, the collar 3 of FIGURE 1, instead of being welded to the end piece 4, may be modified to be retained by merely abutting a shoulder on the suitably modified end piece, and the weld ring 2 may be modified by the provision of a reduced-diameter end portion fitting into the narrower end of the ferrule 1 to centre the latter and facilitate the welding operation to join the weld ring, the ferrule, and the ends of the wire braiding without preventing sliding movement on the tube end piece. Such a modified construction is illustrated in FIG. 5.

Figure 5:
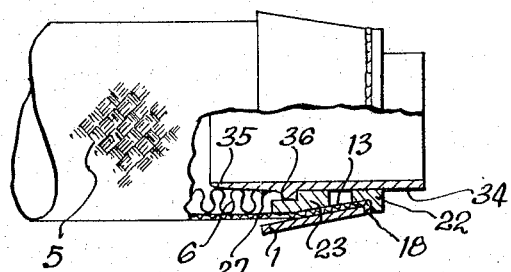

Referring now to FIGURE 5, the same references have been used for parts which are unchanged compared with the preceding figures, so that only the variations from FIGURE 1 need be described. When comparing FIGURE 5 with FIGURE 1, it will be observed that the plain tubular end piece 4 of FIGURE 1 has been replaced by an end adaptor 34 which, instead of being butt-joined to the convoluted tubing 6, is provided with a guide portion 35, which is tapered at its outer side to fit into the end of the convoluted tubing 6, and to the outer surface of which the end of the tubing is welded at 27. The collar 3 of FIGURE 1 has been replaced by a modified collar 23, which is formed with an internal shoulder fitting over a shouldered flange 36 of the end adaptor 34, by which it is retained against the pull of the wire braiding 5. The attachment of the end of the braid wires 13 to the smaller-diameter end of the ferrule 1 is similar to the attachment illustrated in FIGURE 3, but in order to facilitate the formation of the weld 18, the weld ring 2 of FIGURE 3 has been replaced by a stepped weld ring 22, so that the weld is separated from the circumference of the end adaptor 34 by the narrower-diameter portion of the weld ring 22. This reduces the risk of the weld taking on the adaptor, and thus the risk of unintentionally preventing longitudinal displacement of the weld ring on the end adaptor 34.

I claim:
1. In a flexible metal conduit,
the combination comprising a flexible convoluted metal tube,
a tubular metal braid received around said tube,
a tubular generally cylindrical end section connected to one end of said tube,
an externally tapered annular member rigid with said end section and projecting outwardly beyond the outside thereof,
an internally tapered ferrule received around said externally tapered annular member,
said braid extending between said member and said tapered ferrule and being clamped therebetween by the wedging action therebetween,
a ring adjacent the end of said ferrule remote from said convoluted tube,
the end of said braid extending outwardly between the end of said ferrule and said ring,
and a weld uniting the end of said braid to said ferrule and said ring to transmit the tension in said braid to said ferrule so that said tension will increase the wedge clamping action between said ferrule and said tapered member.

2. In a flexible metal conduit,
the combination comprising a flexible convoluted metal tube,
a tubular metal braid received around said tube,
said tube having a generally cylindrical end portion,
an externally tapered annular member received around said end portion,
said end portion having an outwardly projecting flange adjacent the end of said annular member remote from said convoluted tube and retaining said annular member on said end portion,
a tubular generally cylindrical end fitting welded to said flange and said annular member,
an internally tapered ferrule received around said externally tapered annular member,
said braid extending between said member and said ferrule and being clamped therebetween by the wedging action therebetween,
and means connecting the end of said braid to said ferrule to transmit the tension in said braid to said ferrule so that said tension will increase the wedge clamping action between said ferrule and said tapered member.

3. In a flexible metal conduit,
the combination comprising a flexible convoluted metal tube,
a tubular metal braid received around said tube,
said tube having a generally cylindrical end portion,
an externally tapered annular member received around said end portion,
said end portion having an outwardly projecting flange adjacent the end of said annular member remote from said convoluted tube and retaining said annular member on said end portion,
a tubular generally cylindrical end fitting welded to said flange and said annular member, an internally tapered ferrule received around said externally tapered annular member,
said braid extending between said member and said ferrule and being clamped therebetween by the wedging action therebetween,
a ring adjacent the end of said ferrule remote from said convoluted tube,
the end of said braid extending outwardly between said ring and said ferrule,
and a weld securing the end of said braid to said ferrule and said ring so that the tension in said braid will be transmitted to said ferrule and will increase the wedge clamping action between said ferrule and said tapered member.

4. The combination of claim 3,
in which said ring is received around said end fitting.

5. The combination of claim 3,
in which said annular member has a cylindrical extension on the end thereof remote from said convoluted tube,
said ring being received around said cylindrical extension.

6. The combination of claim 1,
in which said ring is received around said cylindrical end section.

7. In a flexible metal conduit,
the combination comprising a flexible convoluted metal tube,
a tubular metal braid received around said tube,
an externally tapered annular member rigid with one end of said tube,
an internally tapered ferrule received around said externally tapered annular member,
said braid extending between said member and said ferrule and being clamped therebetween by the wedging action therebetween,
and means connecting the end of said braid to said ferrule so that the tension in said braid will be transmitted to said ferrule and will increase the wedge clamping action between said ferrule and said tapered member.

8. In a flexible metal conduit,
the combination comprising a flexible convoluted metal tube,
a tubular metal braid received around said tube,
an externally tapered annular member rigid with one end of said tube,
an internally tapered ferrule received around said externally tapered annular member,
said braid extending between said member and said ferrule and being clamped therebetween by the wedging action therebetween,
a ring adjacent the end of said ferrule remote from said convoluted tube,
the end of said braid extending outwardly between the end of said ferrule and said ring,
and a weld securing the end of said braid to said ferrule and said ring so that the tension in said braid will be transmitted to said ferrule and will increase the wedge clamping action between said ferrule and said tapered member.

9. The combination of claim 8,
including a generally cylindrical end member rigid with the end of said convoluted tube,
said ring being disposed around said end member.

10. The combination of claim 8,
in which said annular member has a generally cylindrical extension,
said ring being received around said extension.

References Cited by the Examiner

UNITED STATES PATENTS

| 2,351,416 | 6/1944 | Fentress et al. | 285—149 |
| 3,004,779 | 10/1961 | Cullen et al. | 285—149 |

LAVERNE D. GEIGER, *Primary Examiner.*

T. L. MOORHEAD, *Assistant Examiner.*